United States Patent
Rinscheid

(10) Patent No.: US 8,467,960 B2
(45) Date of Patent: Jun. 18, 2013

(54) NAVIGATION SYSTEM

(75) Inventor: Ansgar Rinscheid, Glinde (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 702 days.

(21) Appl. No.: 12/405,098

(22) Filed: Mar. 16, 2009

(65) Prior Publication Data

US 2009/0234577 A1 Sep. 17, 2009

(30) Foreign Application Priority Data

Mar. 14, 2008 (EP) .................................. 08004807

(51) Int. Cl.
*G01C 21/22* (2006.01)
(52) U.S. Cl.
USPC ............................ 701/416; 701/411; 701/417
(58) Field of Classification Search
USPC ................... 701/201, 416, 417, 411
See application file for complete search history.

(56) References Cited

U.S. PATENT DOCUMENTS

| 6,922,633 | B2 | 7/2005 | Takenaka | |
|---|---|---|---|---|
| 7,561,964 | B2 * | 7/2009 | Vu | 701/416 |
| 7,565,239 | B2 * | 7/2009 | de Silva et al. | 701/426 |
| 2003/0028320 | A1 | 2/2003 | Niitsuma | |
| 2004/0039520 | A1 | 2/2004 | Khavakh et al. | |
| 2004/0215390 | A1 * | 10/2004 | Nomura | 701/209 |
| 2008/0051995 | A1 * | 2/2008 | Lokshin et al. | 701/210 |
| 2009/0018766 | A1 * | 1/2009 | Chen et al. | 701/202 |

* cited by examiner

*Primary Examiner* — Kira Nguyen
(74) *Attorney, Agent, or Firm* — O'Shea Getz P.C.

(57) ABSTRACT

A method of operating a navigation system for a vehicle and a vehicle navigation system are provided, where an initial route to a destination is determined, the initial route that includes a plurality of links, each of which is associated with an initial cost. The initial route may be calculated such that it passes within a predetermined distance of one or more predetermined waypoints. One or more of the predetermined waypoints may be designated as an obligatory waypoint, which will be taken into account when calculating a new route. The initial cost associated with a link in the initial route may be decreased and a new route calculated in the event the vehicle deviates from the initial route.

16 Claims, 5 Drawing Sheets

NAVIGATION SYSTEM

RELATED APPLICATIONS

This application claims priority under 35 U.S.C. §119(a)-(d) or (f) of European Patent Application Serial Number 08 004 807.7, filed on Mar. 14, 2008, entitled "METHOD OF OPERATING A NAVIGATION SYSTEM FOR A VEHICLE AND NAVIGATION SYSTEM FOR A VEHICLE," which application is incorporated in its entirety by reference in this application.

BACKGROUND OF THE INVENTION

1. Field of the Invention

The present invention, in general, relates to a method of operating a navigation system for a vehicle and to a navigation system for a vehicle. More specifically, the present invention relates to a navigation system that provides guidance along a given route and is capable of calculating an advantageous return route to the original route if the vehicle turns off or deviates from the original route.

2. Related Art

In general, the typical task of a navigation system is to guide the driver of a vehicle to a destination on the shortest or the fastest path. Yet for some applications, it is not only important to reach the destination, but also to travel along a predetermined route or path. A good example for such an application is a circular trip or tour, on which several destinations are to be reached. On a circular trip, the starting point and the destination are generally located in close proximity to each other. A navigation system would typically search for the direct path between the starting point and the destination, and guide the driver along this path. With such a system, the guidance along a circular trip that passes by some interesting points, e.g., a monument or a castle, or uses particularly pleasurable road sections, e.g., along a lake, is not possible.

For enabling the guidance along a circular trip, conventional navigation systems may be provided with a list of waypoints. The navigation system then provides guidance in such a way that the waypoints are passed one after the other. A waypoint is marked as reached as soon as the distance to the waypoint becomes smaller than a predetermined value. With such a system, the driver is always guided to the next waypoint that has not yet been passed. Particularly in situations where the driver has left the pre-calculated route, this can be disadvantageous, as the system may guide the driver back to a point which he has not yet passed, even though he has already traveled a fair distance in the direction of the circular trip. Basing the navigation on a round trip on fixed waypoints that have to be passed may thus lead to unfavorable route guidance.

Further, conventional navigation systems may include a function to detour a section of a given route (e.g., in the event of a traffic jam). For returning to the original route, a return point is determined on the original route such as an intersection that has not been passed and is nearest to the current position of the vehicle. A route between the current position and the return point is then searched by minimizing cost, such as traveling time or distance. Additionally, the systems may also search for a new route leading directly from the current position to the destination. Both of these features are disadvantageous when turning off a guided route or when traveling on a circular tour, as directly going back to the guided route may involve turning around and traveling back on the same road section, and directly traveling to the destination is not desired. These conventional systems are in particular not suited for guiding the driver back to a particular road section that the driver wants to travel along, e.g., a particularly scenic road section.

Accordingly, there is a need to provide a method of operating a navigation system that results in an enhanced route guidance along a given route, and to provide a navigation system for a vehicle that is capable of providing such an enhanced route guidance.

SUMMARY

A method of operating a navigation system for a vehicle is disclosed, where the method calculates an initial route from a current position of the vehicle to a predetermined destination, with the initial route including a plurality of links, each of which is associated with an initial cost. The method also provides for decreasing the cost associated with at least one link of the initial route and calculating a new route while including the at least one link associated with a decreased cost. A route from the starting position of the vehicle to a predetermined destination is generally determined by selecting the route associated with the minimum costs. By decreasing the costs associated with one or more links of the initial route, these links are then preferred when performing a further route calculation, which calculation may be performed in response to the vehicle deviating from the initial route. In addition to links, routes may be calculated taking into account waypoints, which may be defined by geographic coordinates, where some waypoints may be designated as obligatory waypoints.

Basing the calculation of the new route on the decreased costs is helpful for initial routes that do not take the fastest or shortest path to a destination, such as a round trip or a sight-seeing tour. Whereas a conventional navigation system would guide the driver straight to the destination when leaving such an initial route, the navigation system being operated in accordance with the invention may guide the driver back onto the initial route. As the cost associated with the initial route is reduced, an algorithm searching for a route with minimum costs will prefer the initial route. When guiding the driver back to the initial route, such an algorithm will also find the most cost-efficient way without the need to place any restrictions on the search of the algorithm, such as a predetermined return point. The method thus provides intelligent guidance back to the original route.

Also disclosed is a navigation system for a vehicle that may include a data providing unit configured to provide an initial route to a predetermined destination, the initial route includes a plurality of links, each associated with an initial cost, a processing unit for decreasing the cost of at least one link of said initial route, and route determination unit configured to calculate a new route using the decreased cost of the at least one link. The navigation system may further include a position determination unit for determining the current position of the vehicle, where the route determination unit calculates the new route from the current position of the vehicle to the predetermined destination in the event the vehicle deviates from the initial route.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention may be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

According to one aspect of the invention, a navigation system for a vehicle is disclosed that includes a data providing unit providing an initial route to a predetermined destination, the initial route including a plurality of links, each of which is associated with an initial cost, a processing unit for decreasing the cost of at least one link of the initial route, and route determination unit using the decreased cost of the at least one link for a further route calculation in case a new route is to be calculated to the predetermined destination. The data providing unit may, for example, be the memory of the navigation system, into which an initial route is loaded from a data carrier, or in which an initial route is stored after it has been determined. The data providing unit may also be in the form of a CD drive, a DVD drive, a wireless connection, or any other means capable of providing an initial route that includes links. The navigation system may further comprise a position determination unit for determining the current position of the vehicle, where the route determination unit calculates the new route from the current position to the predetermined destination in case the vehicle leaves the initial route. By determining the current position, the navigation system can detect when the vehicle has deviated from the initial route and initiate the calculation of a new route. For the new route calculation, the current position may be utilized as a starting position. By considering the reduced costs, the new route will lead in an intelligent way back to the initial route and then follow the initial route to the destination.

Figure 1:
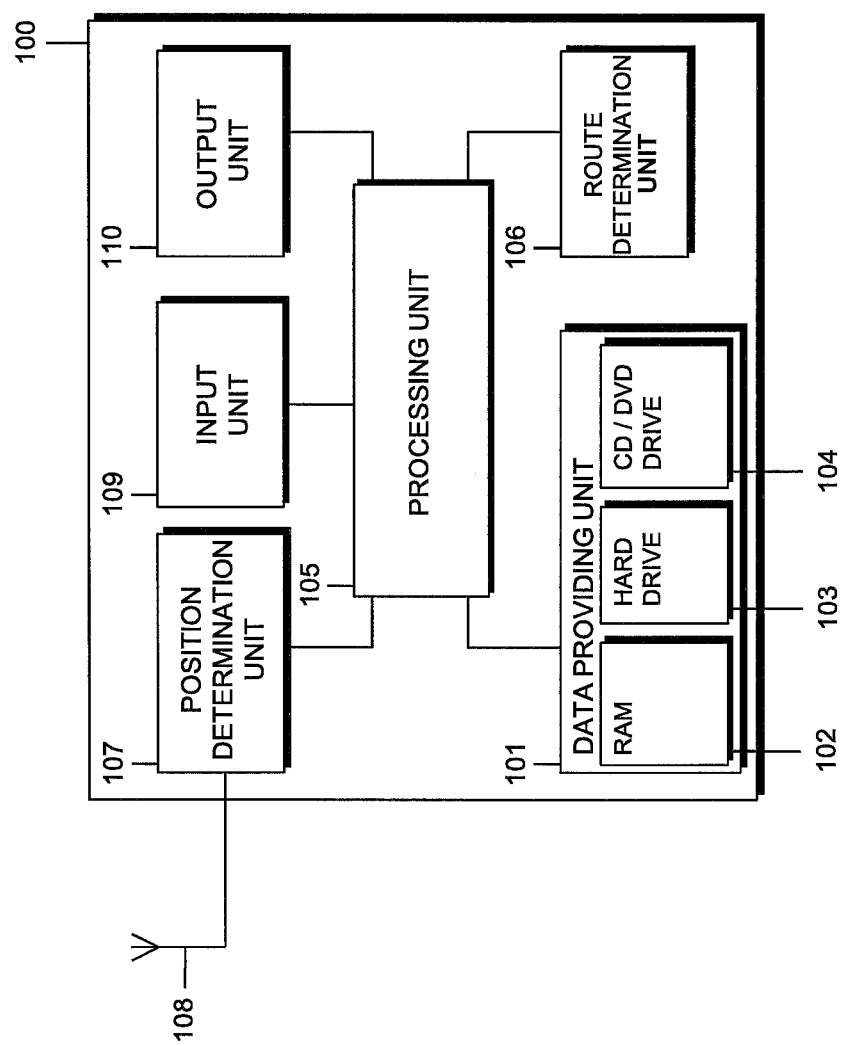
FIG. 1 shows a schematic drawing of a navigation system for a vehicle according to an implementation of the invention.

Turning to FIG. 1, this figure shows a schematic drawing of a navigation system 100 for a vehicle. The navigation system 100 includes a data providing unit 101, which includes a random access memory (RAM) 102, a hard drive or some other kind of non-volatile memory 103, and a CD or DVD drive 104. The data providing unit 101 provides route data to the processing unit 105. In one example of an implementation, the data providing unit provides a list of links that can be designated by, e.g., identification numbers. Using designators, such as identification numbers, of links provides an efficient way of storing a route. Such a route may then be directly available for navigation without the need to search the map data for the corresponding link segment.

In another example, the data providing unit 101 may provide a predetermined number of waypoints. A data carrier, such as a CD or DVD, may be inserted into the navigation system 100 and may be accessed in order to retrieve a number of waypoints that define a sightseeing or a scenic tour. These waypoints may also be stored on another data carrier, such as the hard drive 103, a non-volatile flash memory internal to the navigation system, or other external data carriers, such as a memory stick, a memory card, or may be obtained over a wireless data connection.

By means of one of the above-identified data sources, all of which may be part of the data providing unit 101, map data is provided to the navigation system 100. Map data generally comprise a representation of a road network that includes a plurality of nodes and links. Links represent road segments or road sections, and nodes connect two or more links together. The route determination unit 106 may use this map data to determine a route from a starting point to a destination. As the starting point, the current position of the vehicle, which includes the navigation system 100, may be used, the current position being determined by the position determination unit 107. Position determination unit 107 receives a GPS signal by means of GPS antenna 108, and uses said signal to determine the location of the vehicle. Additionally, a dead reckoning method may be used for position determination. Determining a position by using a GPS signal or dead reckoning is well-known to a person skilled in the art and will therefore not be discussed in greater detail here.

The starting position may alternatively be entered by input unit 109, which may also serve for entering the destination. Input unit 109 may comprise control elements, such as push buttons, push/turn knobs, a touchscreen or the like, and it may also comprise speech input and other means for entering information. Map data, a route, and driving instructions may be provided to the driver by means of output unit 110, the map data being provided, for example, in the form of a graphical display, whereas guidance may be achieved by providing both visual and audible information to the driver.

The route determination unit 106 may have the form of a search algorithm, such as a modified A* or Dijkstra algorithm, which searches the map data for a route with minimum cost from the starting point to the predetermined destination. For example, each link in the map data is associated with a cost, which may be based on the length of the road segment corresponding to the link, the time it requires to travel the road segment, or any other meaningful characteristic of the link, such as fuel consumption for the link or road size. A link in the form of a road segment may be traveled in either direction, and each direction may have its own cost associated with that direction. In some cases, decreasing the cost in only one direction may prevent re-routing to a predetermined destination along links already traveled where the starting position is closely located to the predetermined destination. Of a number of possible routes connecting the starting point and the destination, the route is then found that minimizes one or a combination of the costs associated with the route.

In one implementation, waypoints defining a route may be stored on a data carrier and accessed by the CD/DVD drive 104. By using the map data, the route determination unit 106 finds a route passing essentially through the given waypoints, where start and destination of the route may be given as waypoints or may be determined by the current position or user input. The route determined in this way may then be temporarily stored in RAM 102 or more permanently on the hard drive 103. The links and the nodes of the map data may have identifiers or designators, and accordingly, the route determined by the unit 106 may be in the form of a list of such identifiers. Processing unit 105 reduces the costs of the links in the determined route. The travel time or the distance of a road segment may, for example, be set to values close to 0, e.g., 0.1 km or 0.1 seconds, for a link to which a cost 1 km or 1 minute was originally assigned. The reduced costs and the corresponding links may also be stored in the data providing unit 101.

When the driver navigates along the initially determined route, the necessity may arise that a new route has to be calculated to the predetermined destination. When calculating the new route, the route determination unit 106 takes the stored links of the initial route with the associated reduced costs into account. Doing that will result in a new route that leads back to the initial route and follows the initial route, as the costs associated with the initial route are very low and the search algorithm will therefore prefer links included in the original route. As a result, even if the driver leaves the initial route, he will be guided to the target largely along the initial route.

Further examples of the invention, which may be implemented on a navigation system similar to the navigation system 100, will be described with reference to FIGS. 2-5.

Figure 2:
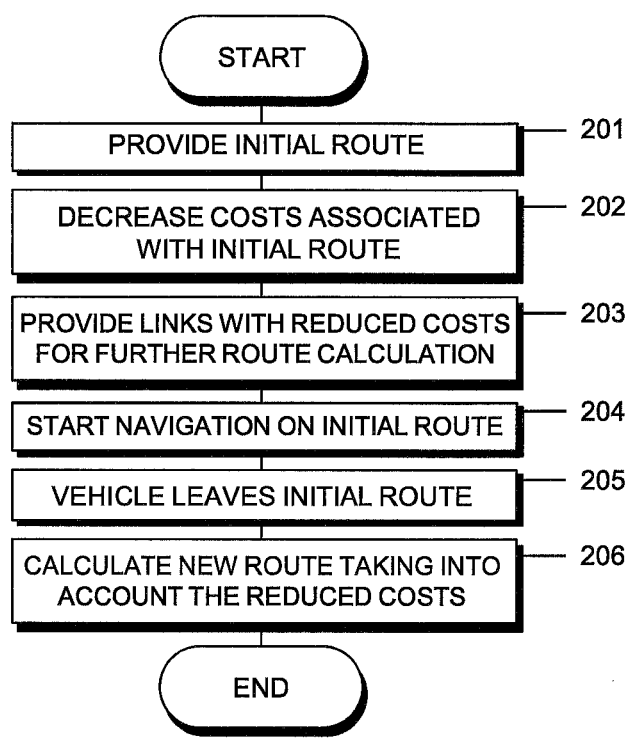
FIG. 2 shows a flow diagram of one example of an implementation of the method according to the invention.
Figure 3:
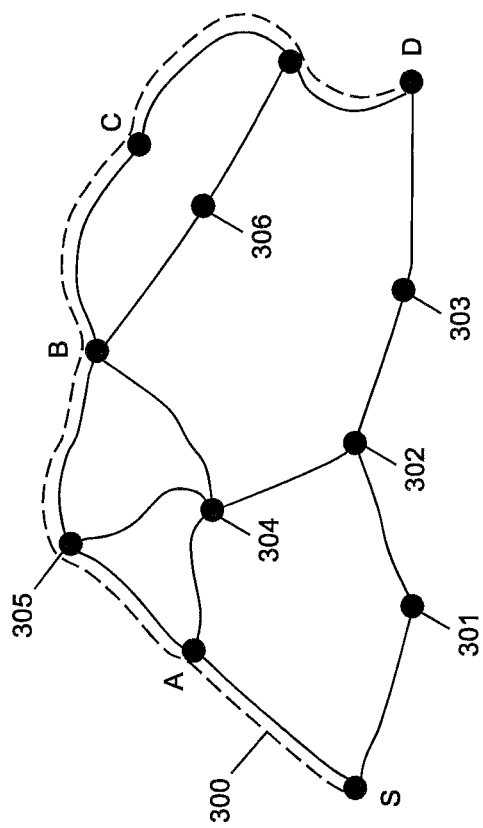
FIG. 3 shows a schematic drawing of a route from a starting point to a destination that includes predetermined links.

In the flow diagram of a method according to the invention shown in FIG. 2, an initial route is provided at step 201. The initial route may be already stored on a memory internal to a navigation system, such as the RAM 102 or the hard drive 103, but it may also be provided on a data carrier. The initial route may, for example, be provided together with map data on a CD or DVD and may take the form of a list of designators specific to the map data. The designator may designate links in the form of vectors associated with a direction. With reference to FIG. 3, the initial route is shown as a dashed line connecting a starting point S with a destination D. The initial route passes by a number of nodes (black circles) and is not the most direct way between S and D. Links or road segments are shown in form of black lines connecting the nodes. Assuming the travel distance being the cost relevant for determining a route, a conventional navigation system would choose the path through nodes 301, 302, and 303 as a route, as this path is the shortest connection between S and D. Yet the initial route may be a particularly beautiful route, such as a scenic drive in a nice landscape, and it may thus not be desired to take the most direct way from S to D.

Returning to the flow diagram of FIG. 2, the costs associated with the initial route (dashed line 300) are decreased in step 202 of FIG. 2. This can be achieved by setting the cost for each link connecting two nodes to a predetermined value, such as 0.1 km or even lower, that is less than the initial cost associated with the link. Alternatively, the decreasing of the cost associated with the link may include the step of weighting the initial cost associated with the link with a predetermined weighting factor, which may have a value in the range of 0 to 1. If the intention is that the initial route is to be followed very closely, the predetermined value or the weighting factor, as the case may be, may be set to a value close to 0, so that a new route leading rather directly back to the initial route will generate lower costs.

These links with the associated reduced costs are then provided for further route calculation in step 203. The route and the costs may be stored in a volatile or non-volatile memory of the navigation system and are provided in such a way that they are considered in the search for a new route. In step 204, the navigation on the initial route is started. The vehicle may, for example, travel from the starting point S to node A, where the navigation system provides guidance to the driver. In step 205, the vehicle leaves the initial route 300 and turns off to node 304. The vehicle navigation system recognizes that the vehicle has left the initial route, and in step 206, a new route is calculated in order to guide the driver to the destination D.

In a conventional navigation system, the route from node 304 through nodes 302 and 303 to the destination D would be determined as the route associated with the minimum costs. Yet this route is rather different from the initially provided route, and the driver would thus miss most of the original scenic drive. By using the described method, a new route is calculated in step 206 taking into account the reduced costs. As the cost associated with the links of the initial route are set to very low values, a route determining unit will determine a route that leads to the most cost-efficient way back to the initial route. The new route determined in such a way may guide the driver from node 304 to node 305, node 305 being the least distant node on the initial route in the traveling direction. The route determination unit may also consider costs for turning the vehicle around, whereby the vehicle may be re-routed on the same link in the opposite direction if within a predetermined distance after leaving the initial route.

The route that will be chosen by the route determination unit may be influenced by the value to which the costs for the links of the initial route are set. By setting them to very low values, the most direct path back to the initial route will be preferred. By setting them to slightly higher values, e.g., between half the original cost associated with a link and 0, a new route may be obtained that prefers a path in the driving direction leading back to the initial route. For example, in FIG. 3, using such costs may result in the new route leading from node 304 to point B, which is still a node on the initial route, yet located more toward the direction of the destination D than node 305.

As can be seen from the described method, reducing the costs associated with the initial route and using the reduced costs for a new route calculation leads to a new route that intelligently guides the driver back onto the initial route. The method is thus well suited for an application where following a given route is of particular importance.

Again referring to FIG. 3, another example of the invention will be described in the following paragraphs. In this example, only waypoints are provided, e.g., on the data carrier. Waypoints S, A, B, C, and D are provided, and optionally, with direction information, to define the route. These waypoints may be defined by geographic coordinates, such as longitude and latitude. Geographic coordinates precisely define a position on the surface of Earth; they are thus independent of map data. In this manner, a route defined by these waypoints may be utilized in conjunction with a wide variety of map data, enabling the user of the navigation system to obtain routes from a large variety of providers. A tour planner may, for example, provide a route in the form of waypoints on a data carrier, which may then be used in any navigation system operating according to this example, independently of the map data base used in the navigation system. Also, when changing the map data on the navigation system, the routes defined by such waypoints may still be used.

The route determination unit now searches for a route that leads from the starting point S to the destination D and passes by the given waypoints A, B, and C. The route determination unit may thus find route 300 (dashed line). This route may now again be given in the form of a list of vectors, and may be temporarily or more permanently stored in the data providing unit 101, FIG. 1. This route can now be taken as an initial route, and the method described with reference to FIG. 2 may be used in order to enable an intelligent navigation along said route. Note that in the present example, not all the given waypoints A, B, and C have to be passed; they merely serve for the initial calculation of the route. If the driver does not pass through one of the given points, the system will not force the driver back towards the missed waypoint, but it will guide the driver back on the initial route in an intelligent way.

Figure 4:
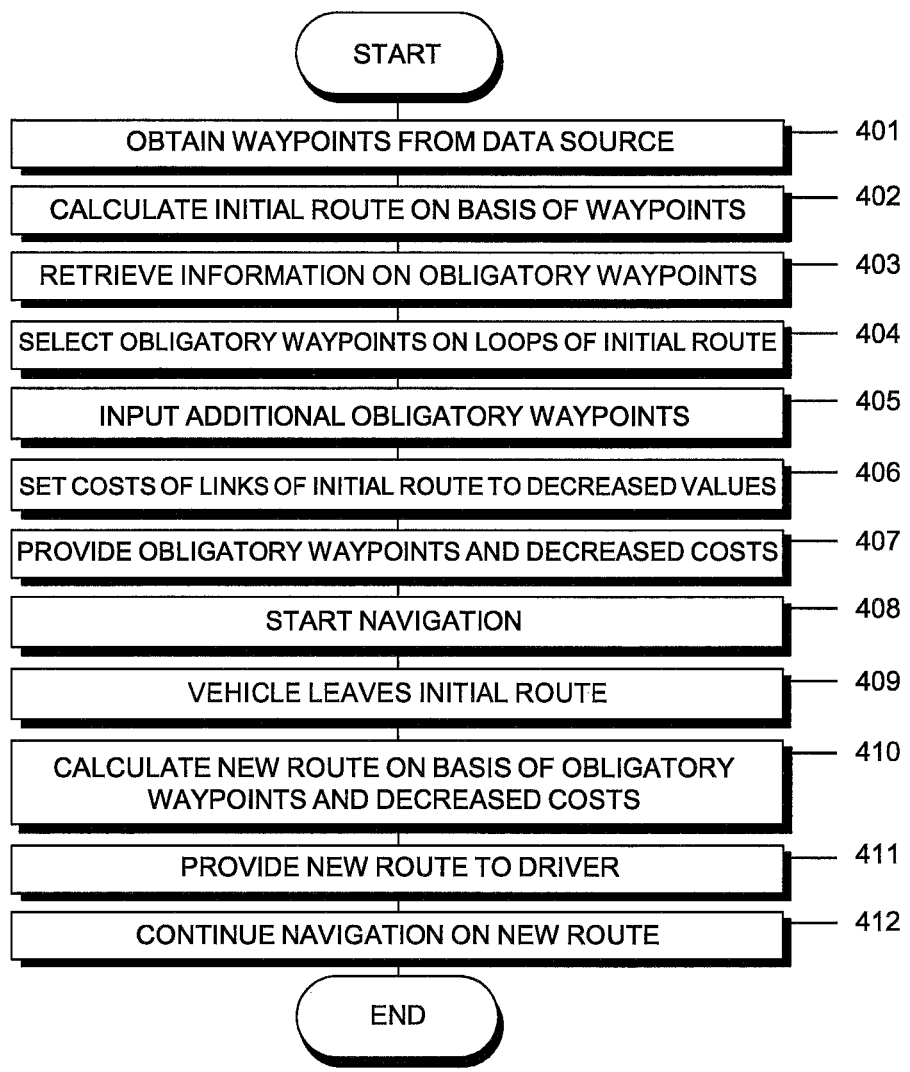
FIG. 4 shows a flow diagram of another example of an implementation of a method according to the invention.
Figure 5:
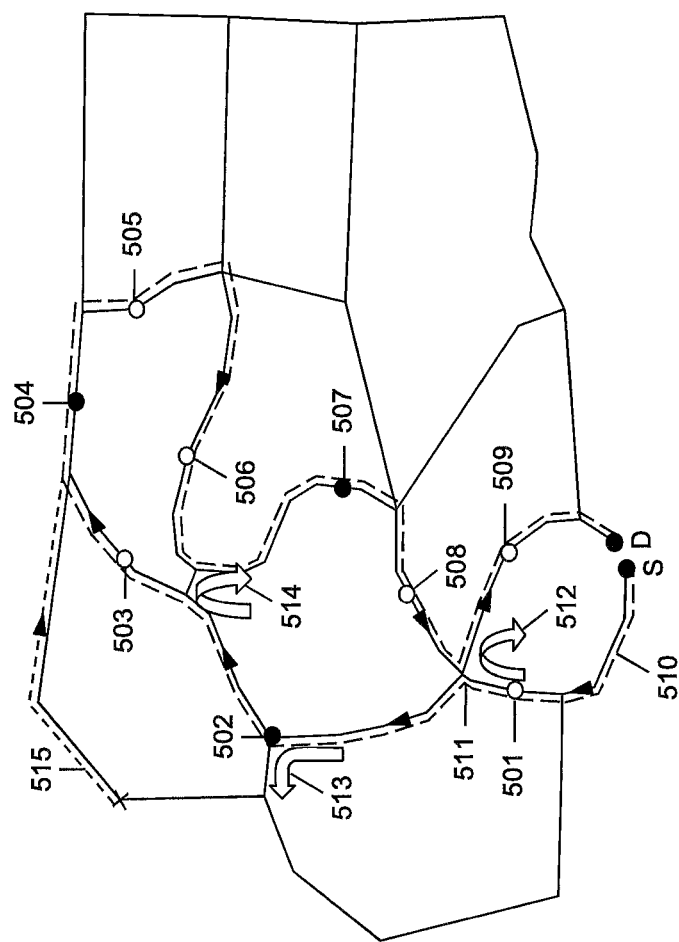
FIG. 5 shows a schematic drawing of a route from a starting point to a destination that includes loops and obligatory waypoints.

Another example will now be described with reference to FIGS. 4 and 5. FIG. 4 shows a flow diagram of another method according to the invention. In a first step 401 of FIG.

4, waypoints are obtained from a data source. With reference to FIG. 5, waypoints 501-509 are obtained from, e.g., a CD that includes a selection of tours, in the form of geographic coordinates. Furthermore, a starting point S and a destination D may be obtained from the data source, yet these may also be determined by the vehicle's current position or by user input. In a next step 402, an initial route from the starting point to the destination taking into account the given waypoints is calculated. A given waypoint may directly coincide with a node of the road network, or it may also mark a point of interest (POI), such as a sight (monument, historic or contemporary buildings, and the like), a hotel or restaurant, or a characteristic point in the landscape. It may not be possible to find a road section that directly passes through or connects up to such a waypoint. Accordingly, the initial route may be calculated so that it passes within a predetermined distance of the given waypoints. For example, the road segment closest to a given waypoint is selected as a segment that includes the initial route. Road segments or links are shown as black lines in FIG. 5; whereas nodes are located at positions where lines meet (nodes are not explicitly shown).

In a next step 403, information on obligatory waypoints is retrieved. Such information may also be provided by the data source providing the given waypoints, such as a data carrier, an internet data source, or the like. An obligatory waypoint is a waypoint along which the route has to pass, at least within a predetermined distance from the obligatory waypoint. Some of the waypoints of a route provided on a data carrier may, for example, be marked as obligatory waypoints, and the navigation system is thus capable of determining that these waypoints are obligatory waypoints by accessing the data carrier. At least one of these waypoints may, for example, correspond to a point of interest (POI), with said POI being designated an obligatory waypoint. When calculating the new route, the at least one obligatory waypoint may be taken into account. The new route may then be determined in such a way that it passes as close as possible by the obligatory waypoints, even if the route may as a result comprise several small roads with high associated costs. Such route determination may be particularly helpful for sightseeing routes, where the sights are marked as obligatory waypoints and are thus passed by the vehicle on the route. The remaining waypoints may only be used to define the initial route and may afterwards be discarded. In combination with reducing the costs of the initial route, the route is thus determined and the driver will be guided back to the route without being forced to pass the non-obligatory waypoints.

The tour defined by the given waypoints may, for example, be a scenic tour passing by a number of landmarks, such as, for example, the Neuschwanstein Castle in Bavaria, Germany. The organizer of such a tour may determine that it should be compulsory to pass by the Neuschwanstein Castle, as otherwise the main attraction of the tour would be missed. The waypoint corresponding to the Neuschwanstein Castle may thus be marked as an obligatory waypoint on the data carrier, and this information is then retrieved by the navigation system in step 403.

According to another example, a waypoint located on a loop of the initial route may be designated as an obligatory waypoint. When the vehicle leaves the initial route and a new route is calculated in response, there will be instances where the new route will not follow the initial route, but take a shortcut. Such an instance may occur when the initial route includes a loop. By designating a waypoint in such a loop as an obligatory waypoint, it is ensured that the new route follows the initial route through the loop. For each loop of the initial route, at least one waypoint may be designated as an obligatory waypoint. As a result, the vehicle navigation system will guide the driver along the whole of the initial route, even when a number of shortcuts exist which may bypass some loops of the initial route. This may be helpful, for example, in the case of a scenic drive, where the driver wants to travel on specific road sections, such as a winding road leading along a coast line.

The designation of an obligatory waypoint may be performed automatically and/or by user input. An obligatory waypoint may, for example, be determined by the navigation system accessing a data carrier having waypoints and obligatory waypoints stored thereon, or by the navigation system analyzing a route containing loops and automatically designating one or more obligatory waypoints for each loop, or by the user selecting a particular waypoint as an obligatory waypoint by means of an input unit. The user may select points along the route that he definitely wants to pass, and these points are then designated as obligatory waypoints. A combination of automatic and user-determination of obligatory waypoints makes for a very flexible route design.

It should be clear that these are only a few examples and that obligatory waypoints may be defined for a wide variety of locations. In the present example, the navigation system selects further obligatory waypoints in step 404. These waypoints are selected on loops of the initial route. One obligatory waypoint is, for example, selected on each loop of the initial route. As obligatory waypoints are already provided in step 403, some loops may already comprise an obligatory waypoint, and an additional obligatory waypoint may not be required for these loops. In a next step 405, a user inputs additional obligatory waypoints. The user may, for example, decide that he definitely wants to see a particular sight on the tour or definitely wants to travel along a particular route section. Accordingly, the user may be given the possibility of inputting an obligatory waypoint in order to force guidance past said waypoint. Input may occur by selecting the obligatory waypoint from a list of points of interest using a control element, or by using a cursor and a cursor control element to directly select the waypoint on a displayed map, or by any other means suitable for selecting a waypoint. It should be understood that, among others, steps 403, 404, and 405 are optional, and that the method may also be carried out without performing these steps.

Again referring to FIG. 5, the initial route is marked by a dashed line 510. Black arrowheads mark the direction in which the route is supposed to be traveled. The obligatory waypoints 502, 504, and 507 are marked as full circles, whereas the remaining waypoints 501, 503, 505, 506, 508, and 509 are displayed as empty circles. The starting point S and the destination D are also obligatory and as such, are marked with a full circle. The non-obligatory waypoints (empty circles) only have the function to define the initial route. After the initial route has been determined, these waypoints may be discarded.

Returning to FIG. 4, for the initial route 510, the costs of links comprised in the initial route are set to decreased values in step 406 of FIG. 4. The cost may be decreased for only one direction of travel, e.g., as indicated by the arrowheads. The cost for traveling in the links in the opposition direction may not be altered. The links of the route associated with the decreased costs and the obligatory waypoints are then provided for a further route calculation in step 407. Navigation is then started in step 408. During navigation, the driver travels along the initial route, starting at starting point S, and is provided with guidance by the navigation system. For example, the navigation system shows the driver the direction in which he intends to travel, and informs him of lane changes and turns which he has to take. The navigation system furthermore monitors the progress of the vehicle on the route, and can determine if the vehicle leaves the given route. In such a case, the navigation system determines a new route which minimizes the traveling costs to the destination. This case will be considered in the following.

In step 409, the vehicle leaves the initial route. A new route is then calculated on the basis of the obligatory waypoints and the decreased costs in step 410. Using both the obligatory waypoints and the links with associated decreased costs for a new route calculation will be explained further below with particular reference to FIG. 5. If a new route has to be calculated in the first section of the initial route 510, e.g., in proximity to the waypoint 501, there is the possibility of taking a shortcut at intersection 511 towards the destination. If the calculation of a new route would only be based on the reduced costs, the system would calculate a route that would bypass most of the tour and directly lead to the destination D through waypoint 509, as indicated by arrow 512. Although an intelligent guidance on the initial route towards the destination will be provided in that case, most of the tour would be missed. This is prevented by the obligatory waypoints, which are taken into account when calculating the new route. In particular, obligatory waypoint 502 has to be passed, and accordingly the new route will lead along the initial route towards said waypoint.

A further possibility of getting off the initial route is given in waypoint 502, in which the driver may take a detour as indicated by arrow 513. The navigation system will now intelligently guide the driver back onto the initial route. As soon as the costs for turning around and traveling back to the point where the route was left are becoming too high, the driver will be guided on an alternative way towards the next obligatory waypoint. In the present example, waypoint 503 is non-obligatory, and accordingly guidance towards waypoint 504 is provided. The new route (515) starts at the current position (x) and leads along the dotted line until it joins the initial route and follows it to the destination D. The tour may furthermore be shortcut by deviating from the initial route as indicated by arrow 514. In order to prevent the shortening as indicated by arrow 514, the obligatory waypoint 504 is set on the initial route. As a result, guidance along the entire route is provided by the navigation system. It is generally sufficient to provide one obligatory waypoint 504 for the loop defined by waypoints 503-506. The obligatory waypoint may be placed close to the apex of the loop. Further obligatory waypoints may be provided if necessary. The provider of the tour may already predetermine the obligatory waypoints 502, 504, 507, as well as S and D, so that the route is followed. Alternatively, waypoint 504 may, for example, correspond to a point of interest provided with the tour, and the obligatory waypoints 502 and 507 are determined by the navigation system, as the driver is supposed to travel on the loops they are located on.

According to another aspect of the invention, a method of operating a navigation system may further comprise the steps of providing route guidance along the route provided by the navigation system. The navigation system may thus give the driver driving instructions so that he can follow the initial or calculated route. When a new route is determined by the navigation system after the driver leaves the initial route, guidance will be provided along the new route. By using one of the above-described methods for determining the initial or the new route, the driver may be guided by the navigation system along the initial route passing by the obligatory waypoints, and when he leaves said route, he will be intelligently guided back onto it. With such guidance, the driver does not need to pass the remaining waypoints, yet he will not miss the obligatory waypoints. Also, he will be guided along the predetermined road section or links in the initial route, even though these may be associated with a higher initial cost than other road sections leading to the same destination.

Again referring to FIG. 4, the new route is provided to the driver in step 411. The new route is, for example, graphically displayed on a display of the navigation system, and guidance along the new route is provided in visual and audible form. In step 412, navigation on the new route is continued.

As can be seen from the above description, the method and system of the invention provide an intelligent guidance along a route from a starting point to a destination. A tour can be defined as a list of links or road sections, or as a number of waypoints given, for example, in the form of geographical coordinates, and guidance is provided along such a route. The navigation system will guide the driver back onto the route, even if the route comprises several loops. The navigation system also provides for particularly important points to be definitely passed. As for following the given route, the system does not rely on given waypoints, but on reduced costs of the links in the route; the driver is not forced to pass all the waypoints defining the route, and he is guided intelligently back onto the route in case he accidentally or intentionally leaves it.

It will be understood, and is appreciated by persons skilled in the art, that one or more processes, sub-processes, or process steps described in connection with FIGS. 2 and 4 may be performed by a combination of hardware and software. The software may reside in software memory internal or external to the processing unit 105, FIG. 1, or other controller, in a suitable electronic processing component or system such as one or more of the functional components or modules depicted in FIG. 1. The software in memory may include an ordered listing of executable instructions for implementing logical functions (that is, "logic" that may be implemented either in digital form such as digital circuitry or source code or in analog form such as analog circuitry), and may selectively be embodied in any tangible computer-readable medium for use by or in connection with an instruction execution system, apparatus, or device, such as a computer-based system, processor-containing system, or other system that may selectively fetch the instructions from the instruction execution system, apparatus, or device and execute the instructions. In the context of this disclosure, a "computer-readable medium" is any means that may contain, store, communicate, propagate, or transport the program for use by or in connection with the instruction execution system, apparatus, or device. The computer readable medium may selectively be, for example, but is not limited to, an electronic, magnetic, optical, electromagnetic, infrared, or semiconductor system, apparatus, device, or medium. More specific examples, but nonetheless a non-exhaustive list, of computer-readable media would include the following: a portable computer diskette (magnetic), a RAM (electronic), a read-only memory "ROM" (electronic), an erasable programmable read-only memory (EPROM or Flash memory) (electronic), and a portable compact disc read-only memory "CDROM" (optical) or similar discs (e.g., DVDs and Rewritable CDs). Note that the computer-readable medium may even be paper or another suitable medium upon which the program is printed, as the program can be electronically captured, via, for instance, optical scanning or reading of the paper or other medium, then compiled, interpreted or otherwise processed in a suitable manner if necessary, and then stored in the memory.

The foregoing description of implementations has been presented for purposes of illustration and description. It is not exhaustive and does not limit the claimed inventions to the precise form disclosed. Modifications, combinations, and variations are possible in light of the above description or may be acquired from practicing the invention. The claims and their equivalents define the scope of the invention.

What is claimed is:

1. A computer-implemented method of operating a navigation system for a vehicle, the method comprising the steps of:
   providing an initial route to a predetermined destination comprising a plurality of links, each of which is associated with an initial cost;
   for at least one link of the initial route, decreasing the initial cost associated with the at least one link;
   providing a plurality of predetermined waypoints;
   designating at least one of the predetermined waypoints as an obligatory waypoint;
   providing the at least one link associated with a decreased initial cost for a further route calculation by the navigation system; and
   in response to the vehicle deviating from the initial route, calculating, with the navigation system, a new route from, a current position of the vehicle to the destination, taking into account the decreased initial cost and the at least one obligatory waypoint such that the new route to the destination must pass the obligatory waypoint at least within a predetermined distance.

2. The method of claim 1, where the initial route is provided in the form of a list of designators of links that is included in map data provided in the navigation system.

3. The method of claim 1, where the decreasing of the initial cost associated with the at least one link includes the step of setting the cost associated with said link to a predetermined value less than the initial cost associated with the at least one link or of weighting the initial cost associated with the at least one link with a predetermined weighting factor.

4. The method of claim 1, further comprising the step of:
   determining a route to the destination passing within a predetermined distance of the at least one predetermined waypoint as the initial route.

5. The method of claim 4, where the locations of the predetermined waypoints are specified by geographic coordinates.

6. The method of claim 1, where a predetermined waypoint located on a loop of the initial route is designated as an obligatory waypoint.

7. The method of claim 1, where for each loop of the initial route, at least one predetermined waypoint is designated as an obligatory waypoint.

8. The method of claim 1, where at least one of the predetermined waypoints corresponds to a point of interest, with the point of interest being designated as an obligatory waypoint.

9. The method of claim 1, where the designation of an obligatory waypoint is performed automatically by the navigation system and/or by user input.

10. The method of claim 1, further comprising the step of providing route guidance along the route provided by the navigation system to a user of the vehicle.

11. The method of claim 1, where the cost is decreased in only one direction of travel of the at least one link of the initial route.

12. A navigation system for a vehicle, the navigation system comprising:
   a data providing unit configured to provide an initial route to a predetermined destination, where the initial route comprises a plurality of links, each of which is associated with an initial cost, and where the data providing unit is configured to provide a plurality of predetermined waypoints including at least one obligatory waypoint;
   a processing unit for decreasing the initial cost of at least one link of the initial route;
   a position determination unit for determining a current position of the vehicle; and
   a route determination unit that calculates a new route from the current position to the destination in the event the vehicle deviates from the initial route, the route determination unit takes into account the decreased initial cost of the at least one link and the at least one obligatory waypoint in calculating the new mute such that the new route to the destination must pass the obligatory waypoint at least within a predetermined distance.

13. The navigation system of claim 12, where the route determination unit determines a route to the destination passing within a predetermined distance of at least one of the plurality of predetermined waypoints as the initial route.

14. A non-transitory computer-readable medium that can be loaded into the internal memory of a computer system, said computer-readable medium comprising software code portions that, when executed on the computer system, perform steps comprising:
   providing an initial route to a predetermined destination comprising a plurality of links, each of which is associated with an initial cost;
   for at least one link of the initial route, decreasing the cost associated with the at least one link;
   providing a plurality of predetermined waypoints;
   designating at least one of the predetermined waypoints as an obligatory waypoint;
   providing the at least one link associated with a decreased cost for a further route calculation by the navigation system; and
   in response to the vehicle deviating from the initial route, calculating, with the navigation system, a new route from a current position of the vehicle to the destination, taking into account the decreased initial cost and the at least one obligatory waypoint such that the new route to the destination must pass the obligatory waypoint at least within a predetermined distance.

15. A computer-implemented method of operating a navigation system for a vehicle, the method comprising the steps of:
   providing an initial route to a predetermined destination comprising a plurality of links, each of which is associated with an initial cost;
   for at least one link of the initial route, decreasing the cost associated with the at least one link;
   providing the at least one link associated with a decreased cost for a further route calculation by the navigation system;
   providing a plurality of predetermined waypoints including at least one obligatory waypoint; and
   in response to the vehicle deviating from the initial route, calculating, with the navigation system, a new route from a current position of the vehicle to the destination taking into account the decreased cost and the at least one obligatory waypoint such that the new route to the destination must pass the obligatory waypoint at least within a predetermined distance.

16. A computer-implemented method of operating a navigation system for a vehicle, the method comprising the steps of:
   providing a plurality of predetermined waypoints;
   determining an initial route to a predetermined destination passing within a predetermined distance of at least one of the predetermined waypoints, where the initial route comprises a plurality of links, each of which is associated with an initial cost;

for at least one link of the initial route, decreasing the initial cost associated with the at least one link; and providing the at least one link associated with a decreased cost for a further route calculation by the navigation system, where at least one predetermined waypoint located on a loop of the initial route is designated as an obligatory waypoint and is provided for further route calculation by the navigation system, and where the navigation system calculates, in response to the vehicle deviating from the initial route, a new route from a current position of the vehicle to the destination, the calculated new route taking into account the decreased cost and the at least one obligatory waypoint such that the new route to the destination must pass the obligatory waypoint at least within a predetermined distance.

\* \* \* \* \*